US012431065B2

(12) United States Patent
Qiu et al.

(10) Patent No.: US 12,431,065 B2
(45) Date of Patent: Sep. 30, 2025

(54) DISPLAY SUBSTRATE, DISPLAY PANEL AND DISPLAY DEVICE

(71) Applicants: Chengdu BOE Optoelectronics Technology Co., Ltd., Sichuan Province (CN); BOE Technology Group Co., Ltd., Beijing (CN)

(72) Inventors: Yuanyou Qiu, Beijing (CN); Binyan Wang, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/769,935

(22) PCT Filed: Apr. 23, 2021

(86) PCT No.: PCT/CN2021/089426
§ 371 (c)(1),
(2) Date: Jun. 10, 2024

(87) PCT Pub. No.: WO2022/222151
PCT Pub. Date: Oct. 27, 2022

(65) Prior Publication Data
US 2024/0321178 A1 Sep. 26, 2024

(51) Int. Cl.
*G09G 3/32* (2016.01)

(52) U.S. Cl.
CPC ....... *G09G 3/32* (2013.01); *G09G 2300/0426* (2013.01); *G09G 2310/0275* (2013.01);
(Continued)

(58) Field of Classification Search
CPC ........ G09G 3/32–3291; G09G 2300/04–0408; G09G 2300/0421; G09G 2300/0426;
(Continued)

(56) References Cited

U.S. PATENT DOCUMENTS

2004/0256966 A1 12/2004 Su et al.
2018/0204889 A1* 7/2018 Yu ........................ G09G 3/3233
(Continued)

FOREIGN PATENT DOCUMENTS

CN 106297707 A 1/2017
CN 107393460 A 11/2017
(Continued)

OTHER PUBLICATIONS

English translation of CN-112466244-A (Year: 2021).*
(Continued)

*Primary Examiner* — Nathan Danielsen
(74) *Attorney, Agent, or Firm* — ArentFox Schiff LLP; Michael Fainberg

(57) ABSTRACT

The embodiment of the present disclosure discloses a display substrate, a display panel and a display device. The display substrate includes a plurality of first pixel circuits located in a frame region, the frame region includes a first sub-region and a second sub-region, the plurality of first pixel circuits include first sub-pixel circuits and second sub-pixel circuits, the first sub-pixel circuits are located in the first sub-region, and the second sub-pixel circuits are located in the second sub-region; and the display substrate further includes a plurality of first light-emitting devices located in a first display region.

19 Claims, 13 Drawing Sheets

(52) U.S. Cl.
CPC ............... *G09G 2310/0286* (2013.01); *G09G 2320/0233* (2013.01)

(58) Field of Classification Search
CPC ... G09G 2310/0202; G09G 2310/0221; G09G 2310/0232; G09G 2310/0243; G09G 2310/0267–0275; G09G 2310/0281; G09G 2310/0286; G09G 2310/04; G09G 2310/06; G09G 2310/08; G09G 2320/0233; G09G 2320/242
See application file for complete search history.

(56) References Cited

U.S. PATENT DOCUMENTS

| | | | |
|---|---|---|---|
| 2020/0175927 A1 | 6/2020 | Zhou | |
| 2021/0013272 A1 | 1/2021 | Zhang et al. | |
| 2021/0201762 A1* | 7/2021 | He | G09G 3/2074 |

FOREIGN PATENT DOCUMENTS

| | | |
|---|---|---|
| CN | 107887424 A | 4/2018 |
| CN | 109584794 A | 4/2019 |
| CN | 112216733 A | 1/2021 |
| CN | 112466244 A | 3/2021 |
| KR | 20060029063 A | 4/2006 |

OTHER PUBLICATIONS

Office Action received for Chinese Patent Application No. 202180000877.9, mailed on Nov. 22, 2024, 26 pages (13 pages of English Translation and 13 pages of Original Document).

* cited by examiner

DISPLAY SUBSTRATE, DISPLAY PANEL AND DISPLAY DEVICE

CROSS-REFERENCE TO RELATED APPLICATIONS

The present application is a US National Stage of International Application No. PCT/CN2021/089426, filed on Apr. 23, 2021, of which the entire contents are incorporated herein by reference.

FIELD

The present disclosure relates to the technical field of display, in particular to a display substrate, a display panel and a display device.

BACKGROUND

With the rapid development of smart phones, not only is the appearance of the mobile phones required to be beautiful, but also better visual experience is brought to mobile phone users. Major manufacturers have begun to increase a screen-to-body ratio on the smart phones, making a full screen a new competition point for the smart phones. With the development of the full screen, the demand for improvement in performance and functions is also increasing day by day; and under the premise of not affecting the high screen-to-body ratio, an under-screen camera can bring a sense of impact to the visual and use experience to a certain extent.

SUMMARY

A display substrate provided by an embodiment of the present disclosure, includes a display region and a frame region, and the display region includes: a first display region and a second display region located on at least one side of the first display region;

- the display substrate includes a plurality of first pixel circuits located in the frame region, the frame region includes first sub-regions and second sub-regions, and the plurality of first pixel circuits include first sub-pixel circuits and second sub-pixel circuits, the first sub-pixel circuits are located in the first sub-regions, and the second sub-pixel circuits are located in the second sub-regions;
- the display substrate further includes a plurality of first light emitting devices located in the first display region, the plurality of first light emitting devices include first sub-light emitting devices and second sub-light emitting devices, the first sub-light emitting devices and the first sub-pixel circuits are electrically connected, and the second sub-light emitting devices and the second sub-pixel circuits are electrically connected; and
- the display substrate includes a plurality of first control lines, the first control lines are configured to provide control signals for the plurality of first pixel circuits, and the first sub-pixel circuits and the first control lines are coupled through first connecting lines, and the second sub-pixel circuits and the first control lines are coupled through second connecting lines.

Optionally, in the above-mentioned display substrate provided by the embodiment of the present disclosure, the frame region includes at least one group of the first sub-regions and the second sub-regions, a first sub-region and a second sub-region of the same group are arranged in a row direction, and the first sub-regions and the second sub-regions of different groups are arranged in sequence in a column direction; and the first sub-pixel circuits of the first sub-region and the second sub-pixel circuits of the second sub-region of the same group are located in the same row; and

- the first sub-region and the second sub-region of the same group are coupled with the same first control line, and the first sub-regions and the second sub-regions of the different groups are coupled with different first control lines.

Optionally, the above-mentioned display substrate provided by the embodiment of the present disclosure, further includes a first drive circuit located in the frame region, the first drive circuit includes a plurality of first shift register units disposed in cascade, and the first control lines and signal output ends of the first shift register units are electrically connected.

Optionally, in the above-mentioned display substrate provided by the embodiment of the present disclosure, the second display region further includes a plurality of second pixel circuits and a plurality of second control lines, each row of the second pixel circuits are electrically connected with the same second control line, different rows of the second pixel circuits are electrically connected with different second control lines, and the second control lines and the first drive circuit are electrically connected.

Optionally, in the above-mentioned display substrate provided by the embodiment of the present disclosure, the first pixel circuits corresponding to the frame region and the second pixel circuits corresponding to the second display region all adopt bilateral driving, each of the first control lines is correspondingly and electrically connected with two of the first shift register units, and each of the second control lines is correspondingly and electrically connected with two of the first shift register units.

Optionally, in the above-mentioned display substrate provided by the embodiment of the present disclosure. the second display region further includes a plurality of second pixel circuits and a plurality of second control lines, each row of the second pixel circuits are electrically connected with the same second control line, and different rows of the second pixel circuits are electrically connected with the different second control lines;

- the display substrate further includes: a second drive circuit located in the frame region, and the second drive circuit includes a plurality of second shift register units disposed in cascade; and
- one of the plurality of second shift register units is electrically connected with one row of the second pixel circuits through the second control line.

Optionally, in the above-mentioned display substrate provided by the embodiment of the present disclosure, a trigger signal of a first stage of first shift register unit and a trigger signal of a first stage of second shift register unit are the same.

Optionally, in the above-mentioned display substrate provided by the embodiment of the present disclosure, the first pixel circuits corresponding to the frame region and the second pixel circuits corresponding to the second display region all adopt bilateral driving, each of the first control lines is correspondingly and electrically connected with two of the first shift register units, and each of the second control lines is correspondingly and electrically connected with two of the second shift register units.

Optionally, in the above-mentioned display substrate provided by the embodiment of the present disclosure, the display substrate further includes a plurality of data lines configured to provide data signals for the plurality of first pixel circuits, the display substrate further includes a plurality of third control lines, the data lines and the third control lines are electrically connected, and the different data lines are electrically connected with the different third control lines; and a first sub-pixel circuit is coupled with a corresponding third control line through a third connecting line, a second sub-pixel circuit is coupled with a corresponding third control line through a fourth connecting line, and the first sub-pixel circuit and the second sub-pixel circuit are coupled with different third control lines.

Optionally, in the above-mentioned display substrate provided by the embodiment of the present disclosure, in a row of the first pixel circuits, except for a region farthest from the first drive circuit, remaining regions are all provided with corresponding compensation capacitors; the compensation capacitors are configured to compensate for a load of the first control lines electrically connected with the corresponding regions; and from a region closest to the first drive circuit to the region farthest from the first drive circuit, a compensation capacitor corresponding to each of the regions is decreased sequentially.

Optionally, in the above-mentioned display substrate provided by the embodiment of the present disclosure, one end of the compensation capacitor is electrically connected with one of the first control lines, and the other end of the compensation capacitor is electrically connected with a voltage stabilization power supply terminal; and the compensation capacitors are configured to compensate for the load of the first control lines electrically connected with the corresponding regions according to a voltage stabilization signal provided by the voltage stabilization power supply terminal.

Optionally, in the above-mentioned display substrate provided by the embodiment of the present disclosure, the frame region includes: a target row with the largest quantity of first pixel circuits in a row direction, and other rows each with the quantity of first pixel circuits in the row direction smaller than that of the target row, the other rows each further includes dummy first pixel circuits, and a sum of the quantity of the first pixel circuits and the quantity of the dummy first pixel circuits of the other rows each is equal to the quantity of the first pixel circuits of the target row.

Optionally, the above-mentioned display substrate provided by the embodiment of the present disclosure, further includes a plurality of second light emitting devices located in the second display region, and each of the plurality of second light emitting devices is correspondingly and electrically connected with each of the plurality of second pixel circuits separately; and a resolution ratio of the first display region and a resolution ratio of the second display region are the same.

Optionally, in the above-mentioned display substrate provided by the embodiment of the present disclosure, the plurality of first pixel circuits are located in the frame region adjacent to the plurality of first light emitting devices.

Optionally, the above-mentioned display substrate provided by the embodiment of the present disclosure, further includes a plurality of transparent conductive layers stacked between the first pixel circuits and the first light emitting devices and insulated from each other, each of the transparent conductive layers includes a plurality of transparent traces, and each of the transparent traces is connected between the first pixel circuit and the first light emitting device in a one-to-one correspondence mode.

Optionally, in the above-mentioned display substrate provided by the embodiment of the present disclosure, the plurality of transparent traces included in each of the transparent conductive layers do not overlap each other, and orthographic projections of the plurality of transparent traces included in the different transparent conductive layers on a base substrate of the display substrate do not overlap each other or partially overlap.

Optionally, in the above-mentioned display substrate provided by the embodiment of the present disclosure, a shape of the first display region is a circle, an ellipse, a square or a polygon.

Optionally, in the above-mentioned display substrate provided by the embodiment of the present disclosure, the first display region is configured to install a light-taking module.

Correspondingly, an embodiment of the present disclosure further provides a display panel, including the above-mentioned display substrate provided by the embodiments of the present disclosure.

Correspondingly, an embodiment of the present disclosure further provides a display device, including: a light-taking module, and the above-mentioned display panel provided by the embodiment of the present disclosure; where, the light-taking module is disposed on the first display region of the display panel.

DETAILED DESCRIPTION OF THE EMBODIMENTS

Figure 1:
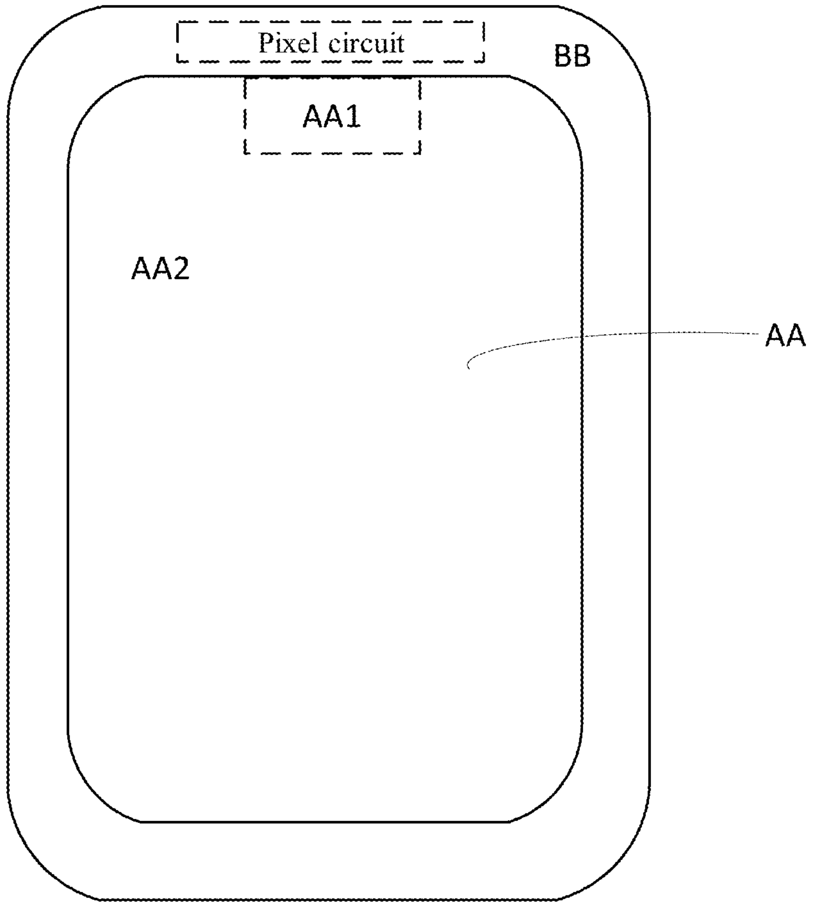
FIG. 1 is a schematic top-view structural diagram of a display substrate according to an embodiment of the present disclosure.

In order to make the objectives, technical solutions, and advantages of embodiments of the present disclosure clearer, the technical solutions of the embodiments of the present disclosure will be described clearly and completely with reference to the accompanying drawings of the embodiments of the present disclosure. Apparently, the described embodiments are some, but not all, embodiments of the present disclosure. Under the condition of no conflict, the embodiments in the present disclosure and the features in the embodiments can be combined with each other. Based on the described embodiments of the present disclosure, all other embodiments attainable by those ordinarily skilled in the art without involving any inventive effort are within the protection scope of the present disclosure.

Unless defined otherwise, technical terms or scientific terms used in the present disclosure shall have the ordinary meaning as understood by those ordinarily skilled in the art to which the present disclosure belongs. The word "include" or "comprise", and other similar words used in the present disclosure mean that a component or an article that precedes the word is inclusive of the component or article listed after the word and equivalents thereof, but does not exclude other components or articles. Similar words such as "connection" or "connected" are not limited to physical or mechanical connections, but may include electrical connections, whether direct or indirect. The terms "inner", "outer", "upper", "lower", and the like are used merely to denote a relative positional relationship that may change accordingly when the absolute position of an object being described changes.

It should be noted that the dimensions and shapes of various figures in the drawings are not to truly scale and are intended to be merely illustrative of the present disclosure. The same or similar reference numerals refer to the same or similar components or components having the same or similar functions throughout.

Figure 2:
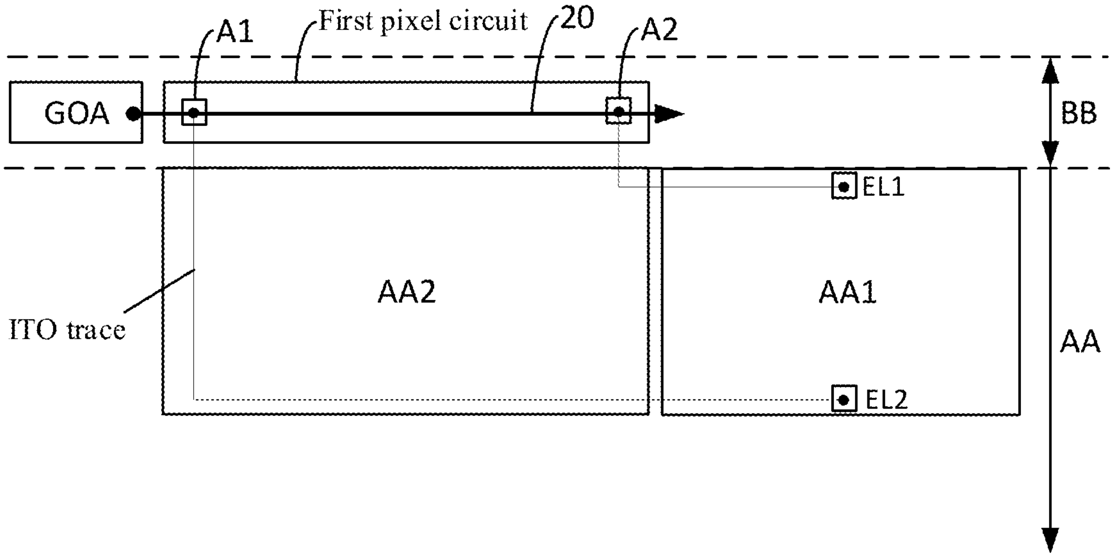
FIG. 2 is a schematic partial enlarged structural diagram corresponding to the display substrate shown in FIG. 1.

In the related art, as shown in FIG. 1, an under-screen camera technology generally sets a first display region AA1 and a second display region AA2 in a display region AA. the second display region AA2 accounts for most of a display screen, the first display region AA1 occupies the remaining part, and the first display region AA1 is a position where an under-screen camera is placed. As shown in FIG. 2, FIG. 2 only shows a part of the region in FIG. 1, one of design schemes of the first display region AA1 corresponding to the under-screen camera is to set pixel circuits of the first display region AA1 in a frame region BB above the first display region AA1, and the pixel circuits are connected with light emitting devices EL in the first display region AA1 through indium tin oxide (ITO) traces. Due to a limited space of the first display region AA1 and the frame region BB, the same column of light emitting devices in the first display region AA1 may be controlled by the pixel circuits in the same row (for example. the light emitting device EL1 is controlled by the pixel circuit A2, and the light emitting device EL2 is controlled by the pixel circuit A1), and the pixel circuits in the same row are usually controlled by the same control line 20 (such as, a gate line Gate).

Figure 3:
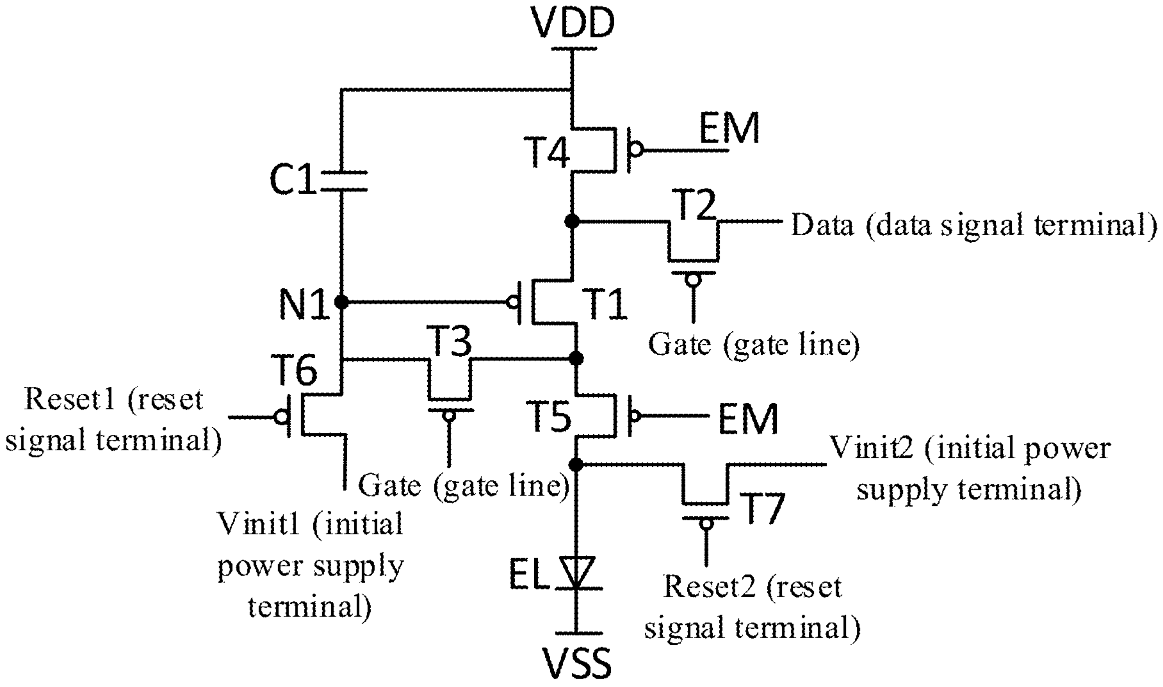
FIG. 3 is a schematic structural diagram corresponding to a pixel circuit in the display substrate shown in FIG. 2.
Figure 4:
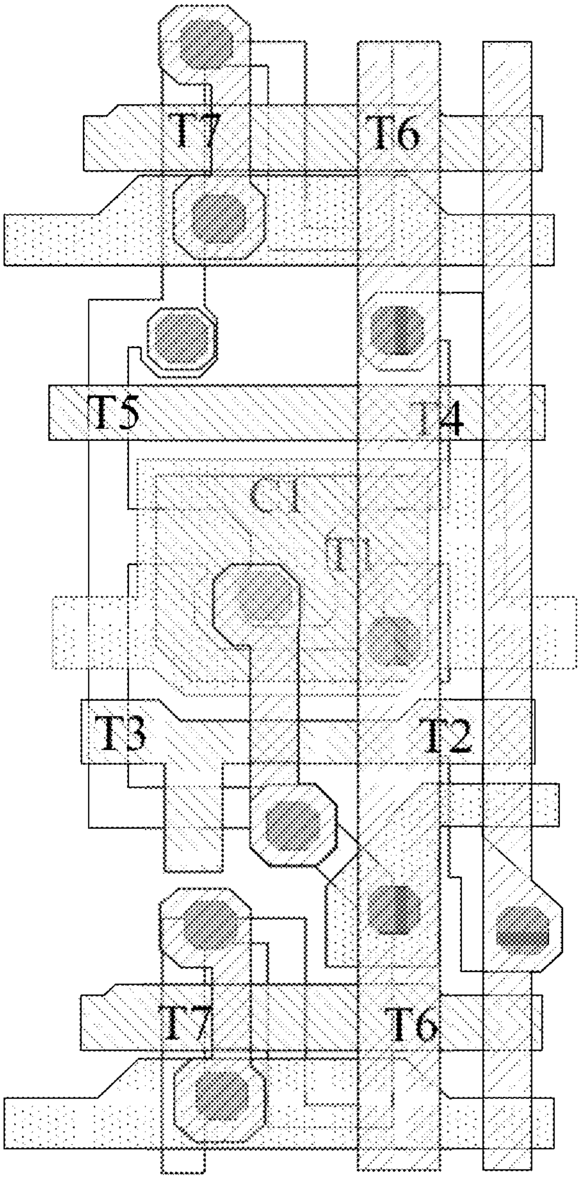
FIG. 4 is a layout schematic diagram corresponding to the pixel circuit shown in FIG. 3.

Optionally, with reference to the pixel circuits shown in FIG. 3 and FIG. 4, the pixel circuits each described in the embodiments of the present disclosure may be a 7T1C structure, that is, including 7 transistors and 1 capacitor. FIG. 3 shows a schematic structural diagram of a 7T1C pixel circuit, and FIG. 4 shows a structural layout of the 7T1C pixel circuit. With reference to the pixel circuits shown in FIG. 3 and FIG. 4, it is known that the 7T1C pixel circuit 10 includes a driving transistor T1, a data writing transistor T2, a threshold compensation transistor T3, a first light emitting control transistor T4, a second light emitting control transistor T5, a first reset transistor T6, a second reset transistor T7 and a storage capacitor C1. The pixel circuit may be connected with a gate signal terminal Gate, a data signal terminal Data, reset signal terminals Reset1 and Reset2, light emitting control signal terminals EM, a power supply terminal VDD, initial power supply terminals Vinit1 and Vinit2, and the light emitting device EL. The light emitting device EL may also be connected with a power supply terminal VSS. The pixel circuit may be configured to drive the connected light emitting device EL to emit light in response to signals provided by the connected signal terminals.

In addition, the transistors may be classified into N-type and P-type transistors according to their characteristics. The embodiments of the present disclosure are described by taking the transistors all adopting the P-type transistors as an example. Based on the description and teachings of the present disclosure, those ordinarily skilled in the art can easily think of using the N-type transistors for at least part of the transistors in a pixel circuit structure of the embodiments of the present disclosure, that is, adopting implementations of the N-type transistors or combination of the N-type transistors and the P-type transistors without any creative work. Therefore, these implementations are also within the protection scope of the embodiments of the present disclosure.

Figure 5:
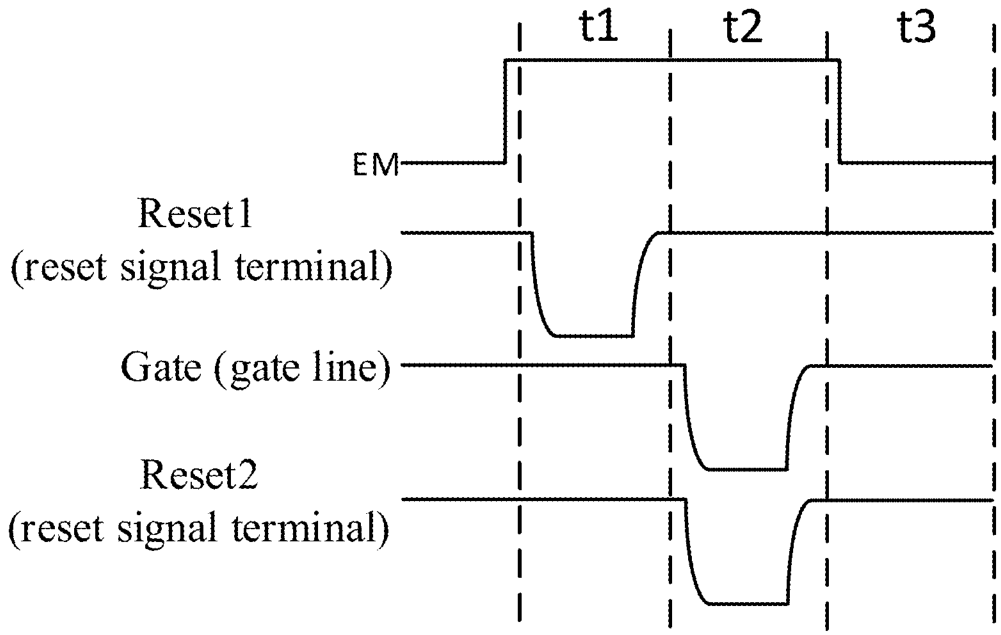
FIG. 5 is a schematic diagram of a working sequence corresponding to the pixel circuit shown in FIG. 3.

As shown in FIG. 5, FIG. 5 is a schematic diagram of a working sequence of the pixel circuit shown in FIG. 3, in a period t1, the first reset transistor T6 is turned on, and a first node N1 is reset; in a period t2, the second reset transistor T7 is turned on, the light emitting device EL is reset, the threshold compensation transistor T3. the driving transistor T1, and the data writing transistor T2 are turned on, and the data signal terminal Data charges the first node N1; at this time, a charging time is determined by a turn-on time of a signal of the control line 20 (such as the gate line Gate), on the basis of the set turn-on time of the signal on the gate line Gate, a load on the gate line Gate will affect a rise time and a fall time of the signal of the gate line Gate, thereby affecting the turn-on time of the signal on the Gate, and the first node N also differs; and in a period t3, the first light emitting control transistor T4 and the second light emitting control transistor T5 are turned on, and the light emitting device EL continues to emit light. Therefore, in the period t2, since the signal on the control line 20 (such as the gate line Gate) is affected by the RC delay, the rise time and the fall time of the control line 20 corresponding to the pixel circuits at different positions in the same row of pixel circuits are different, resulting in different charging times of the pixel circuits (such as A1, A2) at different positions in the same row of pixel circuits (such as A1 . . . A2), a large difference in brightness of the light emitting devices (such as EL1, EL2) correspondingly and electrically connected with the row of pixel circuits, and an uneven display picture.

Figure 6:
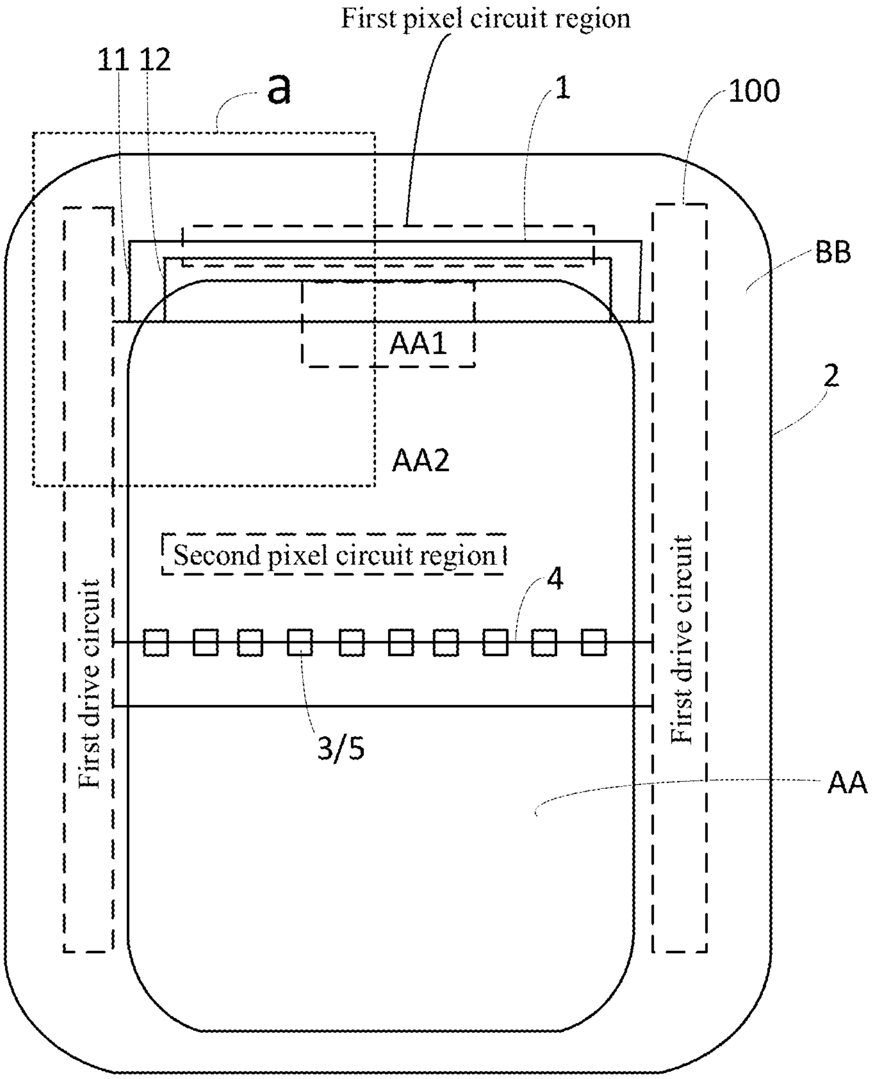
FIG. 6 is a schematic top-view structural diagram of another display substrate according to an embodiment of the present disclosure.
Figure 7:
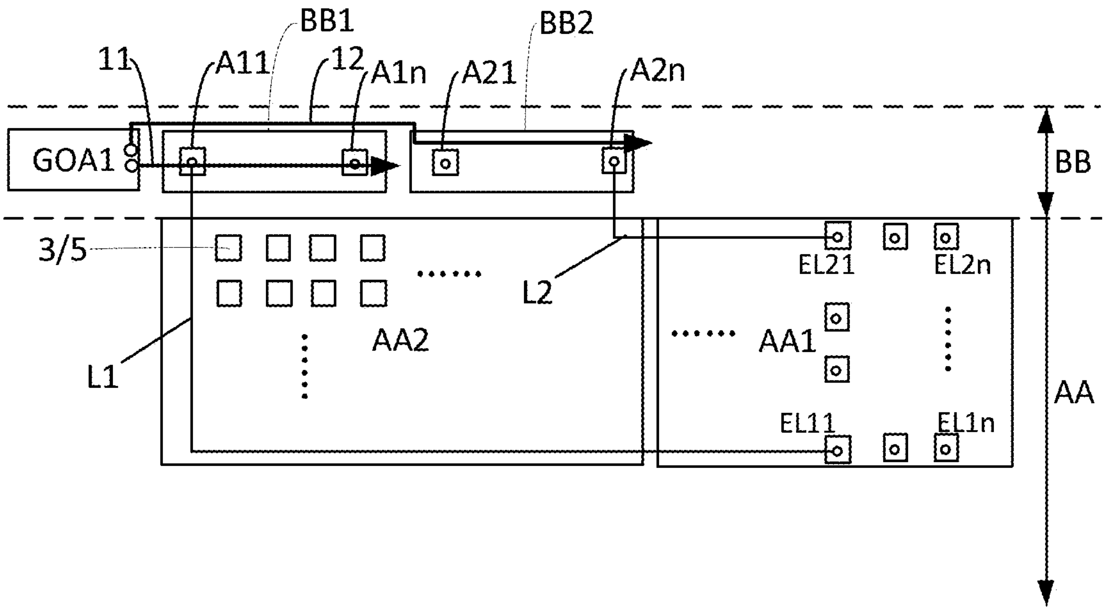
FIG. 7 is a schematic partial enlarged structural diagram corresponding to the display substrate shown in FIG. 6.
Figure 8:
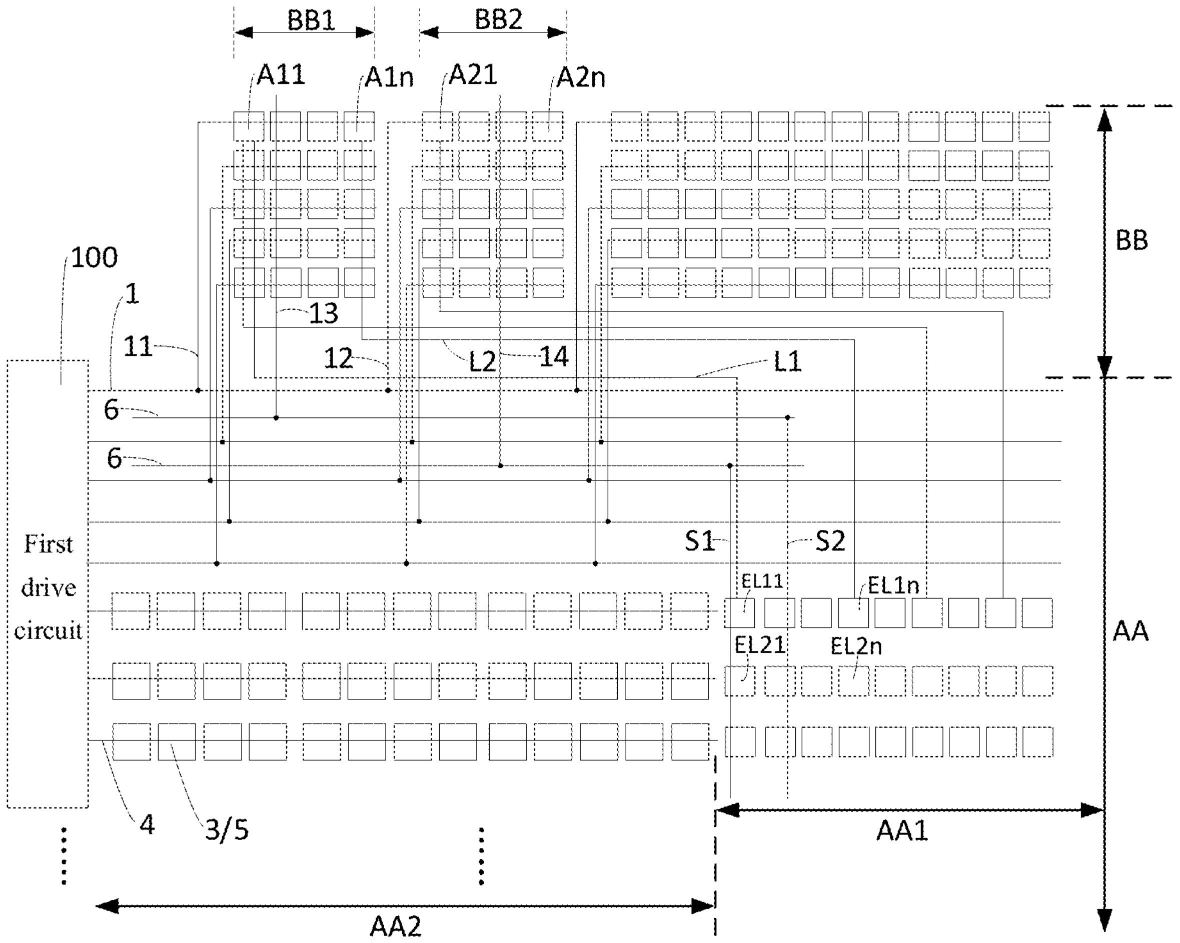
FIG. 8 is another schematic partial enlarged structural diagram corresponding to the display substrate shown in FIG. 6.

In view of the above-mentioned technical problems existing in the related art, embodiments of the present disclosure provide a display substrate, as shown in FIGS. 6-8, including: a display region AA and a frame region BB, FIG. 7 is an equivalent enlarged schematic diagram of the region a in FIG. 6, and FIG. 8 is a detailed enlarged schematic diagram of the region a in FIG. 6. The display region AA includes: a first display region AA1 and a second display region AA2 at least located on one side of the first display region AA1; a transmittance of the first display region AA1 is greater than a transmittance of the second display region AA2; and an area of the second display region AA2 may be much larger than an area of the first display region AA, so a resolution ratio of the second display region AA2 may be larger than a resolution ratio of the first display region AA1. Since the resolution ratio of the second display region AA2 is higher than that of the first display region AA1, a larger part of a display picture may be displayed in the second display region AA2, so the second display region AA2 may also be called a main display region. Moreover, the first display region AA1 may be a transparent display region capable of transmitting light, that is, a region where the first display region AA1 is located may transmit light. In this way, some light-taking modules (for example, a camera, and a fingerprint identification device) required to be configured by display device may be disposed in the first display region AA1 to lay a foundation for a narrow frame design of a display panel. The second display region AA2 may be a non-transparent display region. For example, the first display region AA1 may be the transparent display region, and the second display region AA2 may be the non-transparent display region.

Continuing to refer to FIG. 7 and FIG. 8, the display substrate includes a plurality of first pixel circuits located in the frame region BB, the frame region BB includes a first sub-region BB1 and a second sub-region BB2, the plurality of first pixel circuits include first sub-pixel circuits (A11, A12 . . . A1n) and second sub-pixel circuits (A21, A22 . . . A2n), the first sub-pixel circuits (A11, A12 . . . A1n) are located in the first sub-region BB1, and the second sub-pixel circuits (A21, A22 . . . A2n) are located in the second sub-region BB2.

Continuing to refer to FIG. 7 and FIG. 8. the display substrate further includes a plurality of first light emitting devices located in the first display region AA1, the plurality of first light emitting devices include first sub-light emitting devices (EL11, EL12 . . . EL1n . . .) and second sub-light emitting devices (EL21, EL22 . . . EL2n), the first sub-light emitting devices (EL11, EL12 . . . EL1n) are correspondingly and electrically connected with the first sub-pixel circuits (A11, A12 . . . A1n), and the second sub-light emitting devices (EL21, EL22 . . . EL2n) are correspondingly and electrically connected with the second sub-pixel circuits (A21, A22 . . . A2n). FIG. 7 only shows a row of first sub-light emitting devices (EL11, EL12 . . . EL1n . . .) and a row of second sub-light emitting devices (EL21, EL22 . . . EL2n). For example, the first sub-light emitting device EL11 is electrically connected with the first sub-pixel circuit A11, and the first sub-light emitting device EL1n is electrically connected with the first sub-pixel circuit A1n . . . ; and the second sub-light emitting device EL21 is electrically connected with the second sub-pixel circuit A2n, and the second sub-light emitting device EL2n is electrically connected with the second sub-pixel circuit A21 . . . In some embodiments, since the plurality of first pixel circuits and the plurality of first light emitting devices are located in different regions. orthographic projections of the plurality of first pixel circuits on a base substrate 2 of the display substrate and orthographic projections of the plurality of first light emitting devices on the base substrate 2 do not overlap, that is, the plurality of first pixel circuits and the plurality of first light emitting devices do not have any overlapping area in a direction perpendicular to the display substrate. In this way, an aperture ratio of the first display region AA1 may be ensured, so that a light transmission effect of the first display region AA1 is better.

Continuing to refer to FIG. 7 and FIG. 8, the display region AA of the display substrate includes first control lines 1 configured to provide control signals for the plurality of first pixel circuits, the first sub-pixel circuits (A11, A12 . . . A1n) and the first control lines 1 are coupled through first connecting lines 11, and the second sub-pixel circuits (A21, A22 . . . A2n) and the first control lines 1 are coupled through second connecting lines 12.

It should be noted that, the first control lines may also be divided into the frame region, and may also be divided into the display region.

In the above-mentioned display substrate provided by the embodiments of the present disclosure, the present disclosure adopts the different connecting lines to couple the first pixel circuits controlled by the same first control line to the same first control line, thereby reducing the RC loading (load) of the first control line corresponding to the first sub-region and the second sub-region, so an RC loading (load) difference experienced by the signals of the first control line in different regions is reduced by half, a difference in charging time between the first sub-pixel circuits in the first sub-region and the second sub-pixel circuits in the second sub-region is reduced, and a difference between a brightness of the first sub-light emitting devices electrically connected with the first sub-pixel circuits of the first sub-region and a brightness of the second sub-light emitting devices electrically connected with the second sub-pixel circuits of the second sub-region is also reduced, thereby improving the uniformity of the display picture.

It should be noted that, in the present disclosure, a shape of the first display region AA1 may be a square shown in FIG. 6, or may be other shapes such as a circle, an ellipse or a polygon, and may be specifically designed according to actual needs, which is not limited herein. The second display region AA2 may surround a periphery of the first display region AA1 as shown in FIG. 6, and may also surround part of the first display region AA1, for example, surrounding a left side, a lower side and a right side of the first display region AA1, while an upper boundary of the first display region AA1 coincides with an upper boundary of the second display region AA2. In addition, in the present disclosure, the first light emitting devices (such as EL1, EL2 . . .) refer to pixels actually configured to display and emit light, and the first pixel circuits (such as A1, A2 . . .) are circuits configured to be connected with the first light emitting devices.

Optionally, in the above-mentioned display substrate provided by the embodiments of the present disclosure, as shown in FIG. 6-FIG. 8, the plurality of first pixel circuits are located in the frame region BB adjacent to the plurality of first light emitting devices, and FIG. 6-FIG. 8 specifically show that the plurality of first pixel circuits are located in an upper frame region.

By arranging the plurality of first pixel circuits in the frame region BB adjacent to the plurality of first light emitting devices, a length of transparent traces between the first pixel circuits and the first light emitting devices may be effectively reduced, thereby reducing the resistance of the transparent traces and improving long-range uniformity of drive signals.

Optionally, in the above-mentioned display substrate provided by the embodiments of the present disclosure, as shown in FIG. 6-FIG. 8, the frame region BB includes at least one group of the first sub-region BB1 and the second sub-region BB2 (6 groups are taken as an example in FIG. 8), the first sub-region BB1 and the second sub-region BB2 of the same group are arranged in a row direction, and the first sub-regions BB1 and the second sub-regions BB2 of different groups are arranged in sequence in a column direction; and the first sub-pixel circuits of the first sub-region BB1 and the second sub-pixel circuits of the second sub-region BB2 of the same group are located in the same row.

The first sub-region BB1 and the second sub-region BB2 of the same group are coupled with the same first control line 1, and the first sub-regions BB1 and the second sub-regions BB2 of different groups are coupled with different first control lines 1. In this way, the RC loading of the first control lines corresponding to all the first pixel circuits in the frame region BB may be reduced, so that the difference between the brightness of the first sub-light emitting devices electrically connected with the first sub-pixel circuits of all the first sub-regions BB1 and the brightness of the second sub-light emitting devices electrically connected with the second sub-pixel circuits of the all second sub-regions BB2 is also reduced, thereby further improving the uniformity of the display picture.

Optionally, in the above-mentioned display substrate provided by the embodiments of the present disclosure, as shown in FIG. 6-FIG. 8, the display substrate includes a first drive circuit 100 located in the frame region BB, the first drive circuit 100 includes a plurality of first shift register units (GOA1, GOA2, GOA3 . . . ) disposed in cascade, and the first control lines 1 and signal output ends of the first shift register units are electrically connected. Each of the plurality of first shift register units (GOA1, GOA2. GOA3 . . . ) is correspondingly and electrically connected with each of the plurality of first control lines 1 separately. FIG. 8 only shows five rows of first pixel circuits, a first row of first pixel circuits are correspondingly and electrically connected with a first stage of first shift register unit GOA1, a second row of first pixel circuits are correspondingly and electrically connected with a second stage of first shift register unit GOA2, a third row of first pixel circuits are correspondingly and electrically connected with a third stage of first shift register unit GOA3, and so on.

Optionally, in the above-mentioned display substrate provided by the embodiments of the present disclosure, as shown in FIG. 6-FIG. 8, the second display region AA2 further includes a plurality of second pixel circuits 3 and a plurality of second control lines 4, each row of the second pixel circuits 3 is electrically connected with the same second control line 4, and different rows of the second pixel circuits 3 are electrically connected with the different second control lines 4; and the second control lines 4 are electrically connected with the first drive circuit 100. that is, the first display region AA1 and the second display region AA2 may share the first drive circuit 100.

Optionally, in the above-mentioned display substrate provided by the embodiments of the present disclosure, as shown in FIG. 6-FIG. 8, the first pixel circuits (such as A1, A2 . . . ) corresponding to the frame region BB and the second pixel circuits 3 corresponding to the second display region AA2 all adopt bilateral driving, for example, the first control line 1 corresponding to the first row of first pixel circuits are correspondingly and electrically connected with the two first shift register units GOA1, and the second control line 4 corresponding to a first row of second pixel circuits is correspondingly and electrically connected with the two first shift register units GOAn.

Figure 9:
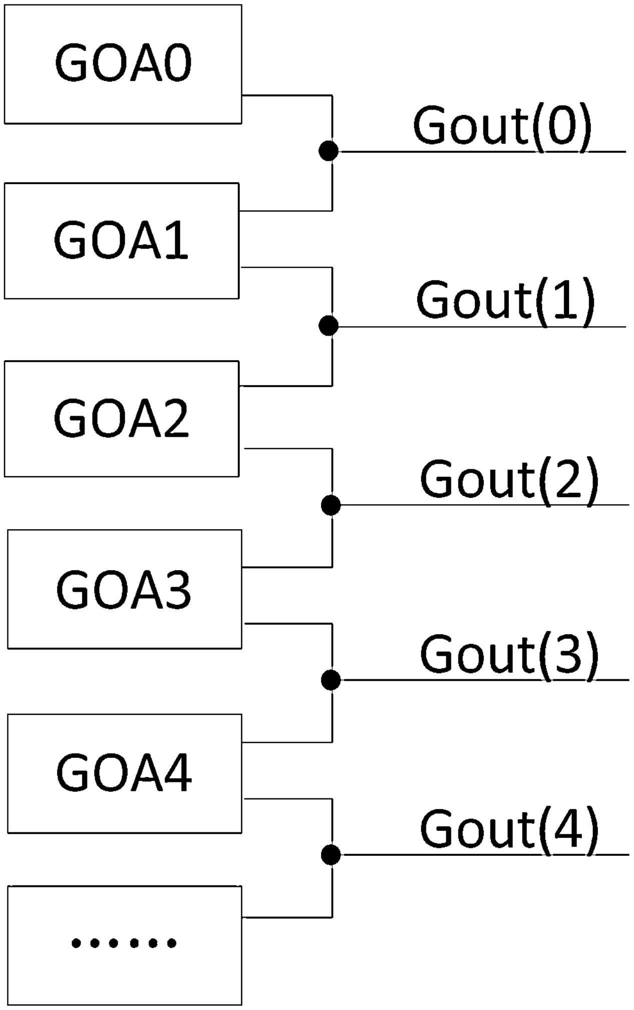
FIG. 9 is a schematic diagram of a first shift register unit corresponding to the display substrate shown in FIG. 6.

As shown in FIG. 9. FIG. 9 is a schematic diagram that the first display region AA1 and the second display region AA2 in FIG. 6-FIG. 8 may share the first drive circuit 100 (including GOA1, GOA2, GOA3 . . . which are disposed in cascade). An output end of each stage of first shift register unit (GOA1, GOA2, GOA3 . . . ) is configured to be connected with the control line electrically connected with the corresponding row of pixel circuits, the output end of at least one stage of first shift register unit (such as the first stage GOA1) is divided into two channels, one of which is electrically connected with the first connecting line 11 corresponding to the first sub-region, and the other is electrically connected with the second connecting line 12 corresponding to the second sub-region; and an output signal of a previous stage of shift register unit (such as the GOA1) is used as an input signal of a next stage of first shift register unit (such as the GOA2).

Optionally, in the display region, a working sequence of the first shift register units corresponding to the first pixel circuits electrically connected with the first light emitting devices contained in a row is the same as a working sequence of the second shift register units corresponding to the second pixel circuits electrically connected with second light emitting devices contained in the same row, so that the first light emitting devices and the second light emitting devices in the same row emit light synchronously.

Figure 10:
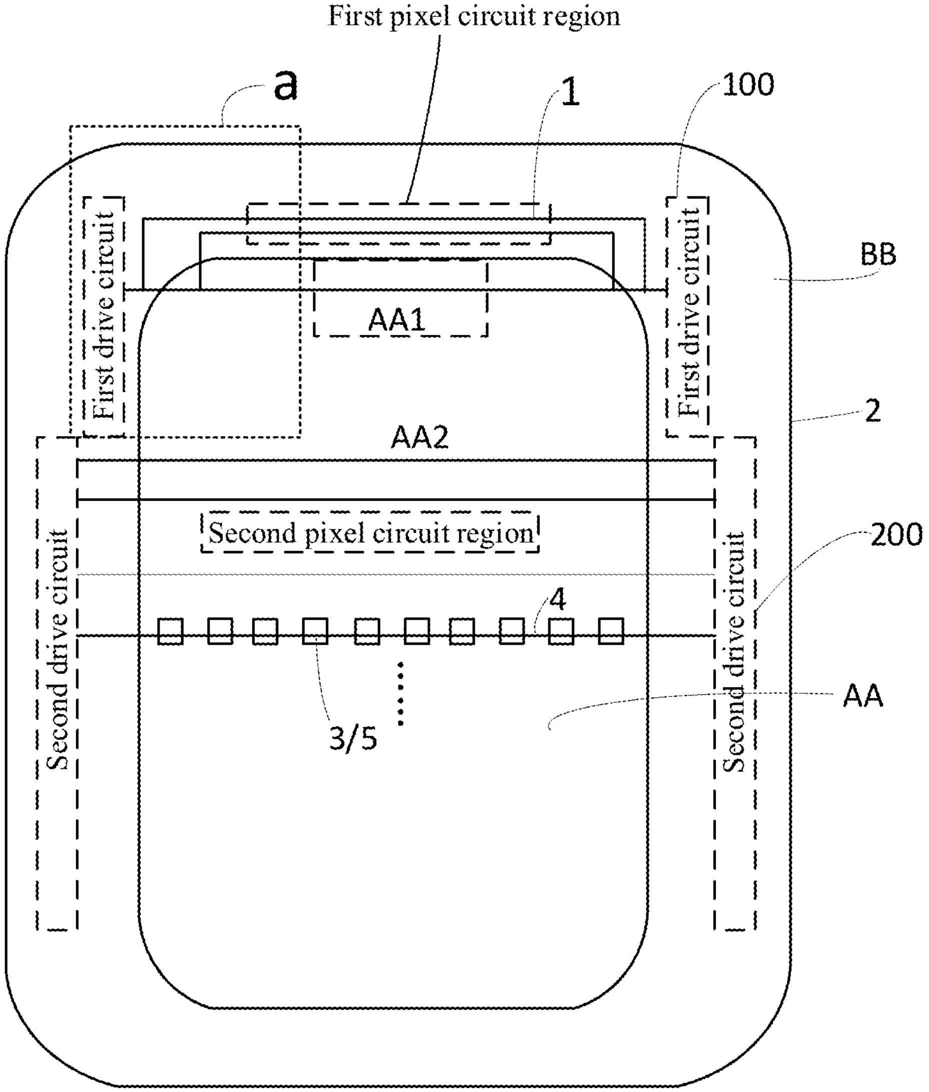
FIG. 10 is a schematic top-view structural diagram of another display substrate according to an embodiment of the present disclosure.
Figure 11:
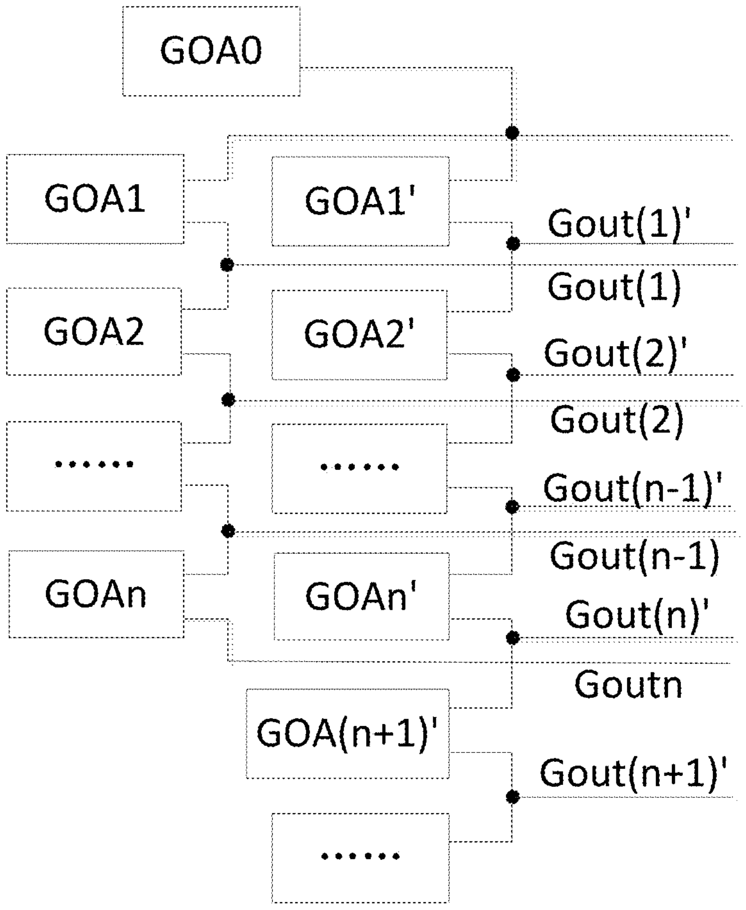
FIG. 11 is a schematic diagram of a first shift register unit corresponding to the display substrate shown in FIG. 10.

Optionally, in the above-mentioned display substrate provided by the embodiments of the present disclosure, as shown in FIG. 10 and FIG. 11, the second display region AA2 further includes the plurality of second pixel circuits 3 and the plurality of second control lines 4, each row of the second pixel circuits 3 are electrically connected with the same second control line 4, and different rows of the second pixel circuits 3 are electrically connected with the different second control lines 4;

the display substrate further includes: a second drive circuit 200 located in the frame region BB, and the second drive circuit includes a plurality of second shift register units (GOA1', GOA2', GOA3' . . . ) disposed in cascade; and the second shift register unit is electrically connected with a row of the second pixel circuits 3 through the second control line 4, so that the first display region AA1 and the second display region AA2 may be independently driven by independent drive circuits.

Specifically, as shown in FIG. 11, FIG. 11 is a schematic diagram of the independent first drive circuit (GOA1, GOA2 . . . ) and the second drive circuit (GOA1', GOA2' . . . ) corresponding the first display region AA1 and the second display region AA2, signals output by output ends Gout( )' correspond to signals on the second control lines 4 of the second display region AA2, and Gout( ) corresponds to signals on the first control lines 1 of the first display region AA1, so that the signals Gout( ) and Gout( )' on the control lines of the pixel circuits of the first display region AA1 and the second display region AA2 can be charged at the same time.

Optionally, in the above-mentioned display substrate provided by the embodiments of the present disclosure, as shown in FIG. 11, trigger signals of the first stage of first shift register unit GOAL and the first stage of second shift register unit GOA1' may be the same, that is, the 0th stage of shift register unit GOA0 may be used to input the trigger signals to the first stage of first shift register unit GOA1 and the first stage of second shift register unit GOA1'. Of course, the trigger signals of the first stage of first shift register unit GOAL and the first stage of second shift register unit GOA1' may also be input by different GOAs.

Optionally, in the above-mentioned display substrate provided by the embodiments of the present disclosure, as shown in FIG. 10 and FIG. 11, the first pixel circuits corresponding to the frame region BB and the second pixel circuits corresponding to the second display region AA2 all adopt bilateral driving, for example, the first control line 1 corresponding to the first row of first pixel circuits is correspondingly and electrically connected with the two first shift register units GOA1, and the second control line 4 corresponding to the first row of second pixel circuits is correspondingly and electrically connected with the two second shift register units GOA1'. In this way, the problem of insufficient charging of the pixel circuits farther away from the GOA when a large-size display screen adopts unilateral driving is prevented, a row of pixel circuits are simultaneously charged from both ends of the control line by adopting bilateral driving, and the charging efficiency can be improved.

Optionally, the control lines in the present disclosure may be gate lines (Gate), reset signal lines (Reset), and light emitting control signal lines (EM). These control lines provide corresponding signals through the corresponding shift register units. Specifically, the gate lines, the reset signal lines, and the light emitting control signal lines may be formed of molybdenum, aluminum, silver, copper, titanium, platinum, tungsten, tantalum, nickel, alloys thereof, and combinations thereof.

Optionally, as shown in FIG. 6 and FIG. 10, the first drive circuit 100 and the second drive circuit 200 in the embodiments of the present disclosure may be gate drive circuits and are configured to provide, for example, line-by-line shifting gate scanning signals for the display region of the display substrate; and the first drive circuit 100 and the second drive circuit 200 may also be light emitting control drive circuits and configured to provide, for example, line-by-line shifting light emitting control signals for the second display region of the display substrate.

Optionally, in the above-mentioned display substrate provided by the embodiments of the present disclosure, the light emitting device refers to an overlapping part of the anode, the luminescent (EL) functional layer and the cathode.

Optionally, in the above-mentioned display substrate provided by the embodiments of the present disclosure, as shown in FIG. 6 and FIG. 8, the display substrate further includes the plurality of second light emitting devices 5 located in the second display region AA2, and each of the plurality of second light emitting devices 5 is correspondingly and electrically connected with each of the plurality of second pixel circuits 3 separately; and the resolution ratio of the first display region AA1 is the same as the resolution ratio of the second display region AA2. That is, the first display region AA1 and the second display region AA2 contain the same quantity of light emitting devices per inch, that is, there are no two partitions with different resolution ratios in the display region, thereby avoiding a light and dark dividing line caused by the different resolution ratios of the first display region AA1 and the second display region AA2, and improving the overall display effect.

Figure 12:
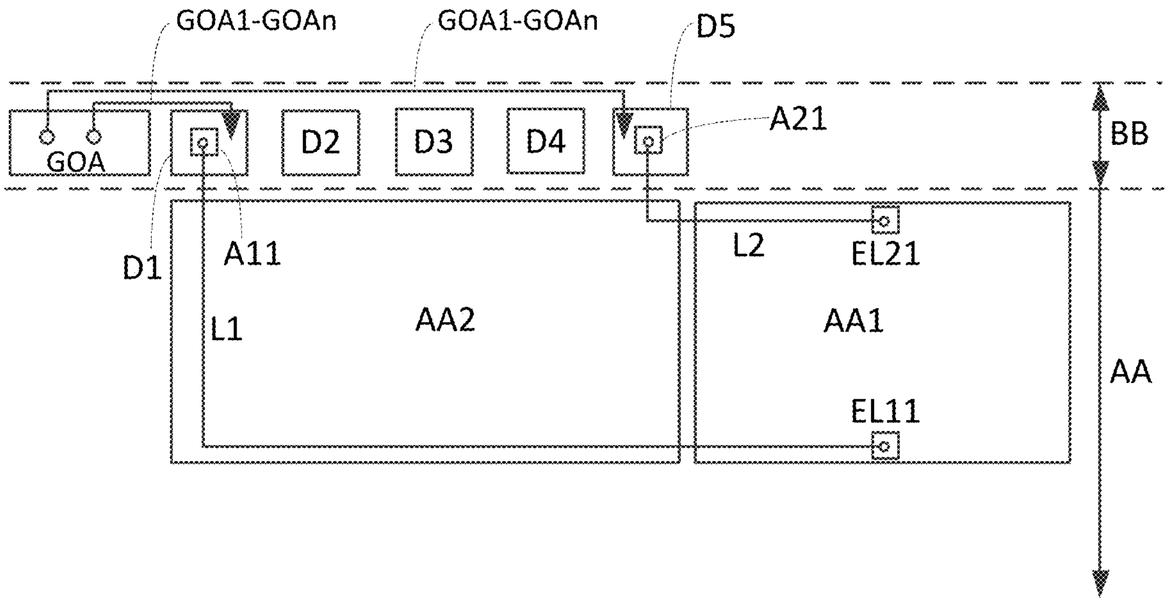
FIG. 12 is another schematic partial enlarged structural diagram corresponding to the display substrate shown in FIG. 6.

As shown in FIG. 12, FIG. 12 is another schematic equivalent enlarged diagram of the region a in FIG. 6, the display substrate includes the plurality of first pixel circuits located in the frame region BB, and the frame region BB includes a plurality of regions (FIG. 12 shows five regions as an example, namely D1, D2, D3, D4 and D5). Each region may include a plurality of rows of first pixel circuits, each region may correspond to the first shift register units (GOA1, GOA2, GOA3 . . . ) which are disposed in cascade in FIG. 9 or FIG. 11, that is, one region corresponds to a group of GOAs disposed in cascade, for example, the region D1 corresponds to a group of GOA1-GOAn disposed in cascade, the output end of the GOAL and the first row of pixel circuits of the region D1, the output end of the GOA2 and the second row of pixel circuits in the region D1, the output end of the GOA3 and the third row of pixel circuits in the region D1, and so on, For example, the region D2 corresponds to a group of GOA1-GOAn disposed in cascade, the output end of the GOAL and the first row of pixel circuits in the region D2, the output end of the GOA2 and the second row of pixel circuits in the region D2, the output end of the GOA3 and the third row of pixel circuits in the region D2, and so on. For example, the region D3 corresponds to a group of GOAL-GOAn disposed in cascade, the output end of the GOA1 and the first row of pixel circuits in the region D3, the output end of the GOA2 and the second row of pixel circuits in the region D3, the output end of the GOA3 and the third row of pixel circuits in the region D3, and so on.

Figure 13:
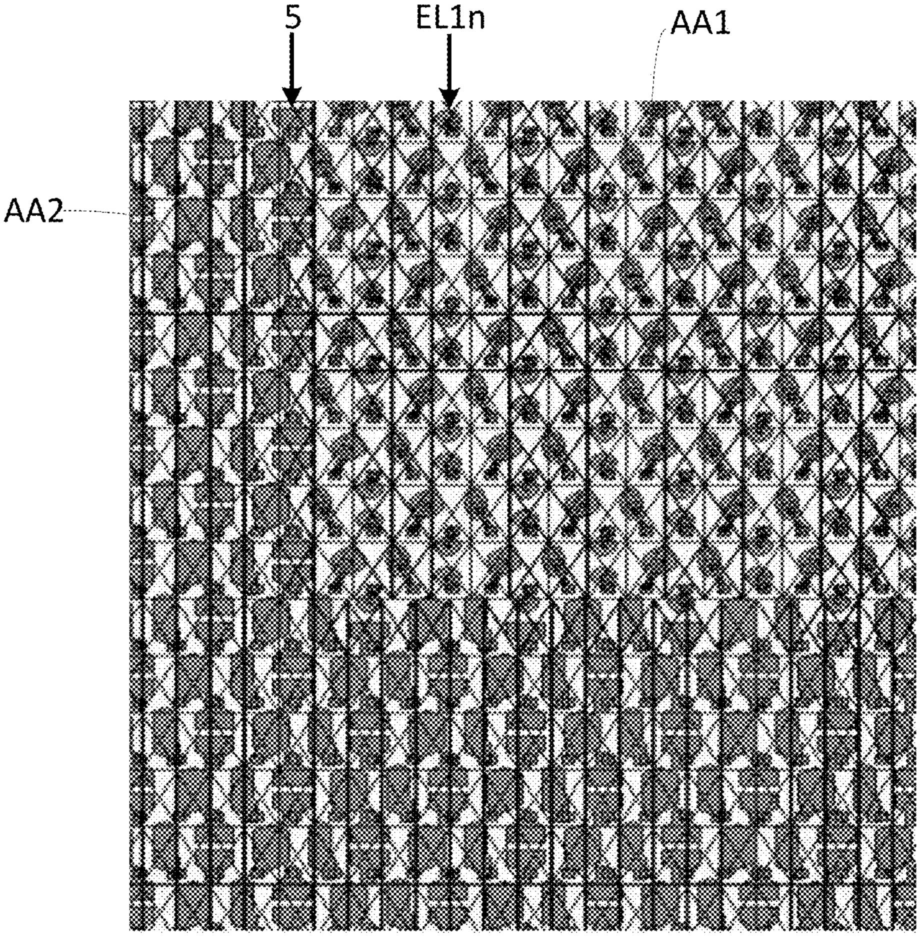
FIG. 13 is another schematic partial enlarged structural diagram corresponding to the display substrate shown in FIG. 6.

As shown in FIG. 13, FIG. 13 is a schematic partial enlarged diagram of the display substrate shown in FIG. 6, illustrating the first light emitting devices (such as EL1n) located in the first display region AA1 and the second light emitting devices 5 located in the second display region AA2, it can be seen with reference to FIG. 11 that a size of the first light emitting devices (EL1n, EL2n) may be smaller than that of the second light emitting devices 5, that is, the anodes of the light emitting devices in the first display region AA1 are smaller than those of the light emitting devices in the second display region AA2. In this way, it can be ensured that the light transmittance of the first display region AA1 is larger than that of the second display region AA2.

Optionally, in the above-mentioned display substrate provided by the embodiments of the present disclosure, the display substrate may further include a plurality of transparent conductive layers stacked between the first pixel circuits and the first light emitting devices and insulated from each other, each transparent conductive layer includes a plurality of transparent traces (FIG. 8 specifically shows a plurality of transparent traces L1 and L2 on the same layer), and each transparent routing wire is connected between the first pixel circuit and the first light emitting device in a one-to-one correspondence mode. That is, each first pixel circuit (such as A11) may be connected with one first light emitting device (such as EL11) through one transparent routing wire L1, and each first pixel circuit (such as A1n) may be connected with one first light emitting device (such as EL1n) through one transparent routing wire L2, and so on; and the first light emitting devices connected with the first pixel circuits are different. The embodiments of the present application do not limit a connection relationship.

As shown in FIG. 8, since each transparent routing wire extending in the row direction has a certain width in the column direction, each transparent routing wire extending in the column direction also has a certain width in the row direction, and sizes of the pixels in the column direction and the row direction are also fixed, the number of the pixels in each row or column in the first display region AA1 is limited. In the present disclosure, the plurality of transparent conductive layers that are stacked and insulated from each other are used, so that more transparent traces can be provided within a certain size range in the column direction or row direction, so as to drive more first light emitting devices, thereby meeting the same resolution ratio with the second display region AA2.

Optionally, in the above-mentioned display substrate provided by the embodiments of the present disclosure, the plurality of transparent traces included in each transparent conductive layer do not overlap each other, and orthographic projections of the plurality of transparent traces included in different transparent conductive layers on the base substrate do not overlap each other. Of course, since the different transparent conductive layers are insulated from each other, during specific implementation, the orthographic projections of the plurality of transparent traces included in the different transparent conductive layers on the base substrate may also partially overlap or completely overlap, which is not limited herein.

Since the limited space of the display region and the frame region, the same column of light emitting devices in the first display region may be controlled by the first pixel circuits in the same row. Therefore, in the above-mentioned display substrate provided by the embodiments of the present disclosure, as shown in FIG. 8, at least one column of the first light emitting devices (such as EL11 . . . EL1n) is correspondingly and electrically connected with the first pixel circuits (such as A11 . . . A1n) in the same row.

Optionally, in the above-mentioned display substrate provided by the embodiments of the present disclosure, as shown in FIG. 8, the display substrate further includes a plurality of data lines (S1, S2 . . .) configured to provide data signals for the plurality of first pixel circuits (such as A11 . . . A2n), the display region AA further includes a plurality of third control lines 6, the data lines are electrically connected with the third control lines 6, and the different data lines are electrically connected with the different third control lines 6, for example, the data line SI is electrically connected with the third control line 6, and the data line S2 is electrically connected with another third control line 6. The first sub-pixel circuit (such as A12) is coupled with the corresponding third control line 6 through a third connecting line 13, the second sub-pixel circuit (such as A23) is coupled with the corresponding third control line 6 through a fourth connecting line 14, and the first sub-pixel circuit (such as A12) and the second sub-pixel circuit (such as A23) are coupled with the different third control lines 6.

During specific implementation, as shown in FIG. 8, the first control lines 1, the second control lines 4, and the third control lines 6 are disposed on the same layer; the first connecting lines 11, the second connecting lines 12, the third connecting line 13 and the fourth connecting line 14 are disposed on the same layer; and the above-mentioned control lines and the above-mentioned connecting lines may be disposed on the same layer or different layers. The first control lines 1 and the third control lines 6 may be divided into the display region AA, and may also be divided into the frame region BB.

During specific implementation, as shown in FIG. 8, the third control lines 6 may be alternately arranged with the first control lines 1, and of course, all the third control lines 6 may be located above or below all the first control lines 1.

During specific implementation, as shown in FIG. 8, the data lines (S1, S2 . . .) may be located in the first display region AA1 and may also be located in the second display region AA2, which are designed according to the actual situation of a product.

It should be noted that the first pixel circuits are generally electrically connected with the first light emitting devices through the transparent traces, and the first pixel circuits located in the same row are not necessarily electrically connected with the first light emitting devices in the same column. Specifically: the frame region may be divided into several small regions, the placement of the first pixel circuits is related to the transparent traces, and a specific connection relationship between the first pixel circuits and the first light emitting devices is set according to the actual situation.

Figure 14:
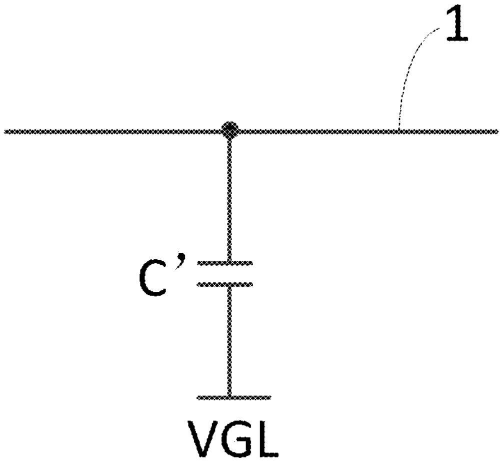
FIG. 14 is a schematic structural diagram of a compensation capacitor of a first sub-region.

As shown in FIG. 8, taking the first row of first pixel circuits (A11 . . . A1n) as an example, the signal output by the same output end of the first drive circuit 100 is output to the first connecting line 11 and the second connecting line through the first control line 1, since a length of the first control line 1 through which the signal received by the second connecting line 12 passes is greater than a length of the first control line 1 through which the signal received by the first connecting line 11 passes, the display substrate includes a plurality of metal film layers, and a plurality of types of signal traces are disposed, so a coupling capacitor will be formed between the first control line 1 and the first sub-region BB1, resulting in the load of the second sub-region BB2 being larger than that of the first sub-region BB1. In order to further reduce the load difference between the first sub-region BB1 and the second sub-region BB2, optionally, in the above-mentioned display substrate provided by the embodiments of the present disclosure, as shown in FIG. 14, FIG. 14 is a schematic structural diagram of a compensation capacitor corresponding to the first sub-region BB1 provided by the embodiments of the present disclosure, at least one row of the first pixel circuits (taking the first row A11 . . . A1n as an example), except for a region (such as the second sub-region BB2) farthest from the first drive circuit 100, other regions (such as the first sub-region BB1) are provided with corresponding compensation capacitors C'; the compensation capacitors C' are configured to compensate for a load on the first control lines 1 electrically connected with the corresponding regions (such as the first sub-region BB1); and from a region (such as the first sub-region BB1) closest to the first drive circuit 100 to the region (such as the second sub-region BB2) farthest from the first drive circuit 100, the compensation capacitor corresponding to each region is decreased sequentially; and if a row of pixels is only divided into two regions, the first pixel circuits of the first sub-region BB1 are provided with the corresponding compensation capacitors C', and the second sub-region BB2 is not provided with a compensation capacitor.

Optionally, in the above-mentioned display substrate provided by the embodiments of the present disclosure, taking the compensation capacitor C' disposed in the first sub-region BB1 shown in FIG. 8 as an example, as shown in FIG. 14, one end of the compensation capacitor C' is electrically connected with the first control line 1, and the other end of the compensation capacitor C' is electrically connected with a voltage stabilization power supply terminal VGL; and the compensation capacitor C' is configured to compensate for the load on the first control line 1 electrically connected with the corresponding region (the first sub-region BB1) according to a voltage stabilization signal provided by the voltage stabilization power supply terminal VGL, so that a difference between the load on the first control line 1 electrically connected with the first sub-region BB1 and the load on the first control line I electrically connected with the second sub-region BB2 is reduced, so that a brightness difference of the first light emitting devices electrically connected with the first control line 1 corresponding to the different regions is further reduced, thereby further improving the uniformity of the display picture in the first display region AA1.

Optionally, in the above-mentioned display substrate provided by the embodiments of the present disclosure, since the first control line is the gate line Gate, the gate line Gate is electrically connected with the gate, the compensation capacitor C' may be disposed by increasing an area of the gate electrically connected with the gate line Gate, and the enlarged portion may be used as one end of the compensation capacitor C'.

Optionally, in the above-mentioned display substrate provided by the embodiments of the present disclosure, the voltage stabilization power supply terminal may also be a power supply signal terminal such as VGH, VDD, VSS, etc.

It should be noted that FIG. 8 is described by taking a row of the first pixel circuits divided into two regions as an example, of course, if a row of the first pixel circuits is divided into three or more regions, except for the region farthest from the first drive circuit 100, other regions are provided with the corresponding compensation capacitors C'. Of course, a row of the first pixel circuits is set according to the size of the frame region BB and actual needs.

Figure 15:
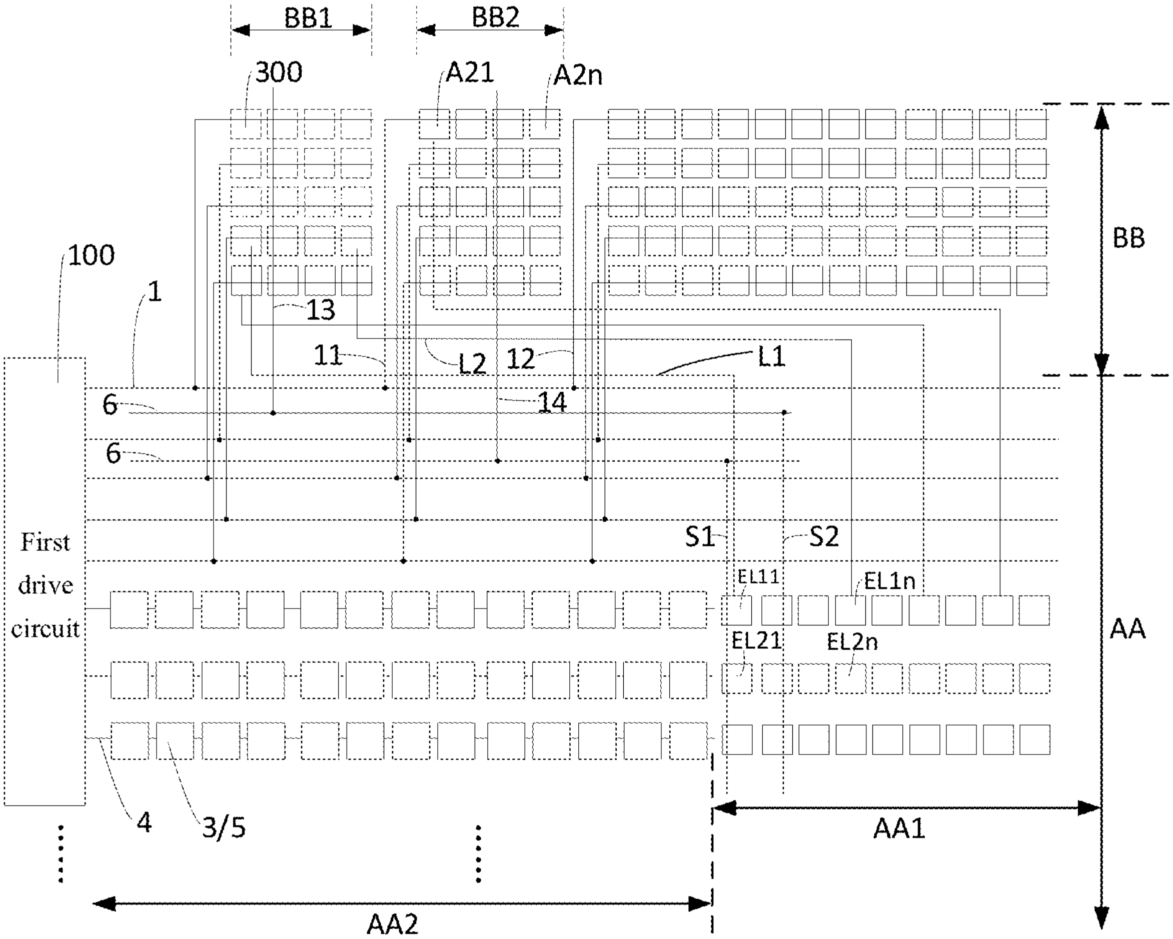
FIG. 15 is another schematic partial enlarged structural diagram corresponding to the display substrate shown in FIG. 6.

Optionally, in the above-mentioned display substrate provided by the embodiments of the present disclosure, as shown in FIG. 15, the frame region BB may include: target rows (such as a fourth row and a fifth row) with the largest number of the first pixel circuits (indicated by a solid line box) in the row direction, and other rows (such as a first row, a second row, and a third row) with the number of the first pixel circuits being smaller than that of the target rows in the row direction. In order to ensure the consistent pixel circuits to ensure the uniformity of the display picture, other rows each (such as the first row, the second row, and the third row) further include dummy first pixel circuits 300 (indicated by a dashed box), and a sum of the number of the first pixel circuits and the number of the dummy first pixel circuits 300 of the other rows each (such as the first row, the second row, and the third row) is equal to the number of the first pixel circuits of the target rows each (such as the fourth row and the fifth row).

Optionally, in the above-mentioned display substrate provided by the embodiments of the present disclosure, as shown in FIG. 6 and FIG. 10, the first display region AA1 is configured to install a light-taking module, such as a camera module. In the present disclosure, only the first light emitting devices exist in the first display region AA1, so that a light transmission region with a larger area can be provided, which is helpful for adapting to a camera module of a larger size.

In another aspect, an embodiment of the present disclosure further provides a display panel, including the above-mentioned display substrate provided by the embodiments of the present disclosure. Optionally, the display panel may be an organic electroluminescence display panel (OLED), a quantum dot light emitting display panel (QLED), or a micro light emitting diode display panel (Micro LED). Since the principle of solving the problem of the display panel is similar to the principle of solving the problem of the above-mentioned display substrate, the implementation of the display panel provided by the embodiment of the present disclosure may refer to the implementation of the above-mentioned display substrate provided by the embodiments of the present disclosure, and the repetition will not be repeated.

In another aspect, an embodiment of the present disclosure further provides display device, including: a light-taking module (such as a camera module), and the above-mentioned display panel. The light-taking module is disposed in a first display region AA1 of the display panel. Optionally, the light-taking module may be the camera module. The display device may be: a mobile phone, a tablet computer, a TV, a monitor, a notebook computer, a digital photo frame, a navigator, a smart watch, a fitness wristband, a personal digital assistant, or any other product or component that has a display function. Other essential components of the display device should be understood by those ordinarily skilled in the art, and will not be described in detail here, nor should it be regarded as a limitation of the present disclosure. In addition, since the principle of solving the problem of the display device is similar to the principle of solving the problem of the above-mentioned display panel, the implementation of the display device may refer to the embodiment of the above-mentioned display panel, and the repetition will not be repeated.

In the above-mentioned display substrate, the display panel and the display device provided by the embodiments of the present disclosure, the first pixel circuits controlled by the same first control line are coupled to the same first control line by using the different connecting lines, so that the RC loading (load) of the first control lines corresponding to the first sub-region and the second sub-region is reduced, so the RC loading (load) difference experienced by the signals of the first control line in the different regions is reduced by half, a difference in charging time between the first sub-pixel circuits in the first sub-region and the second sub-pixel circuits in the second sub-region is reduced, and the difference between the brightness of the first sub-light emitting devices electrically connected with the first sub-pixel circuits of the first sub-region and the brightness of the second sub-light emitting devices electrically connected with the second sub-pixel circuits of the second sub-region is also reduced, thereby improving the uniformity of the display picture.

Although the preferred embodiments of the present disclosure have been described, additional variations and modifications may be made to these embodiments by those skilled in the art once the basic inventive concept is known. Therefore, it is intended that the appended claims be interpreted as including the preferred embodiments and all alterations and modifications that fall within the scope of this disclosure.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A display substrate, comprising a display region and a frame region, wherein the display region comprises: a first display region and a second display region arranged on at least one side of the first display region;

the display substrate comprises a plurality of first pixel circuits arranged in the frame region, the frame region comprises first sub-regions and second sub-regions, and the plurality of first pixel circuits comprise first sub-pixel circuits and second sub-pixel circuits, the first sub-pixel circuits are arranged in the first sub-regions, and the second sub-pixel circuits are arranged in the second sub-regions;

the display substrate further comprises a plurality of first light emitting devices arranged in the first display region, the plurality of first light emitting devices comprise first sub-light emitting devices and second sub-light emitting devices, the first sub-light emitting devices and the first sub-pixel circuits are electrically connected, and the second sub-light emitting devices and the second sub-pixel circuits are electrically connected; and the display substrate comprises a plurality of first control lines, the plurality of first control lines are configured to provide control signals for the plurality of first pixel circuits, and the first sub-pixel circuits and the plurality of first control lines are coupled through first connecting lines, and the second sub-pixel circuits and the plurality of first control lines are coupled through second connecting lines;

wherein the frame region comprises at least one group of the first sub-regions and the second sub-regions, a first sub-region and a second sub-region of a same group are arranged in a row direction, and the first sub-regions and the second sub-regions of different groups are arranged in sequence in a column direction; and the first sub-pixel circuits of the first sub-region and the second sub-pixel circuits of the second sub-region of the same group are arranged in the same row; and the first sub-region and the second sub-region of the same group are coupled with a same first control line, and the first sub-regions and the second sub-regions of the different groups are coupled with different first control lines.

2. The display substrate according to claim 1, further comprising a first drive circuit arranged in the frame region, wherein the first drive circuit comprises a plurality of first shift register units disposed in cascade, and the plurality of first control lines and signal output ends of the first shift register units are electrically connected.

3. The display substrate according to claim 2, wherein the second display region further comprises a plurality of second pixel circuits and a plurality of second control lines;

each row of the plurality of second pixel circuits are electrically connected with a same second control line;

different rows of the plurality of second pixel circuits are electrically connected with different second control lines; and the plurality of second control lines and the first drive circuit are electrically connected.

4. The display substrate according to claim 3, wherein the plurality of first pixel circuits corresponding to the frame region and the plurality of second pixel circuits corresponding to the second display region all adopt bilateral driving;

each of the plurality of first control lines is correspondingly and electrically connected with two of the plurality of first shift register units; and each of the plurality of second control lines is correspondingly and electrically connected with two of the plurality of first shift register units.

5. The display substrate according to claim 3, further comprising a plurality of second light emitting devices arranged in the second display region;

wherein each of the plurality of second light emitting devices is correspondingly and electrically connected with each of the plurality of second pixel circuits separately; and a resolution ratio of the first display region and a resolution ratio of the second display region are same.

6. The display substrate according to claim 2, wherein the second display region further comprises a plurality of second pixel circuits and a plurality of second control lines, each row of the plurality of second pixel circuits are electrically connected with a same second control line, and different rows of the plurality of second pixel circuits are electrically connected with different second control lines;

the display substrate further comprises: a second drive circuit arranged in the frame region, and the second drive circuit comprises a plurality of second shift register units disposed in cascade; and one of the plurality of second shift register units is electrically connected with one row of the plurality of second pixel circuits through a second control line.

7. The display substrate according to claim 6, wherein a trigger signal of a first stage of first shift register unit and a trigger signal of a first stage of second shift register unit are same.

8. The display substrate according to claim 6, wherein the plurality of first pixel circuits corresponding to the frame region and the plurality of second pixel circuits corresponding to the second display region all adopt bilateral driving;

each of the plurality of first control lines is correspondingly and electrically connected with two of the plurality of first shift register units; and each of the plurality of second control lines is correspondingly and electrically connected with two of the plurality of second shift register units.

9. The display substrate according to claim 2, wherein in a row of the plurality of first pixel circuits, except for a region farthest from the first drive circuit, remaining regions are all provided with corresponding compensation capacitors; the compensation capacitors are configured to compensate for a load of the first control lines electrically connected with corresponding regions; and from a region closest to the first drive circuit to the region farthest from the first drive circuit, a compensation capacitor corresponding to each of the regions is decreased sequentially.

10. The display substrate according to claim 9, wherein one end of the compensation capacitor is electrically connected with one of the first control lines, and the other end of the compensation capacitor is electrically connected with a voltage stabilization power supply terminal; and the compensation capacitors are configured to compensate for the load of the first control lines electrically connected with the corresponding regions according to a voltage stabilization signal provided by the voltage stabilization power supply terminal.

11. The display substrate according to claim 1, wherein the display substrate further comprises a plurality of data lines configured to provide data signals for the plurality of first pixel circuits, the display substrate further comprises a plurality of third control lines, the plurality of data lines and the plurality of third control lines are electrically connected, and different data lines are electrically connected with different third control lines; and a first sub-pixel circuit is coupled with a corresponding third control line through a third connecting line, a second sub-pixel circuit is coupled with a corresponding third control line through a fourth connecting line, and the first sub-pixel circuit and the second sub-pixel circuit are coupled with different third control lines.

12. The display substrate according to claim 1, wherein the frame region comprises: a target row with a largest quantity of the first pixel circuits in a row direction, and other rows each with a quantity of the first pixel circuits in the row direction smaller than that of the target row;

the other rows each further comprises dummy first pixel circuits; and a sum of the quantity of the first pixel circuits and a quantity of the dummy first pixel circuits of the other rows each is equal to the quantity of the first pixel circuits of the target row.

13. The display substrate according to claim 1, wherein the plurality of first pixel circuits are arranged in the frame region adjacent to the plurality of first light emitting devices.

14. The display substrate according to claim 1, further comprising a plurality of transparent conductive layers stacked between the plurality of first pixel circuits and the plurality of first light emitting devices and insulated from each other;

wherein each of the plurality of transparent conductive layers comprises a plurality of transparent traces; and each of the plurality of transparent traces is connected between a first pixel circuit and a first light emitting device in a one-to-one correspondence mode.

15. The display substrate according to claim 14, wherein the plurality of transparent traces comprised in each of the plurality of transparent conductive layers do not overlap each other, and orthographic projections of the plurality of transparent traces comprised in different transparent conductive layers on a base substrate of the display substrate do not overlap each other or partially overlap.

16. The display substrate according to claim 1, wherein a shape of the first display region is a circle, an ellipse, a square or a polygon.

17. The display substrate according to claim 1, wherein the first display region is configured to install a light-taking module.

18. A display panel, comprising the display substrate according to claim 1.

19. A display device, comprising: a light-taking module and the display panel according to claim 18;

wherein the light-taking module is disposed on the first display region of the display panel.

* * * * *